United States Patent [19]
Hirai et al.

[11] Patent Number: 5,737,211
[45] Date of Patent: Apr. 7, 1998

[54] LINEAR-MOTION CONTACTLESS POWER SUPPLY SYSTEM

[75] Inventors: Junji Hirai; Yoshiji Hiraga, both of Fukuoka, Japan

[73] Assignee: Kabushiki Kaisha Yaskawa Denki, Kitakyushu, Japan

[21] Appl. No.: 693,251

[22] PCT Filed: Feb. 17, 1995

[86] PCT No.: PCT/JP95/00225

§ 371 Date: Aug. 19, 1996

§ 102(e) Date: Aug. 19, 1996

[87] PCT Pub. No.: WO95/22849

PCT Pub. Date: Aug. 24, 1995

[30] Foreign Application Priority Data

Feb. 21, 1994 [JP] Japan ................. 6-047856
Feb. 24, 1994 [JP] Japan ................. 6-053228

[51] Int. Cl.⁶ ........................ H02M 1/00; H01F 21/06
[52] U.S. Cl. .......................... 363/144; 336/118
[58] Field of Search .......................... 363/144; 336/117, 336/118, 119, 129, 175, DIG. 2

[56] References Cited

U.S. PATENT DOCUMENTS 5,301,096  4/1994  Klontz et al. ............. 363/37
5,341,280  8/1994  Divan et al. ............. 363/37
5,608,615  3/1997  Luce ..................... 363/102

FOREIGN PATENT DOCUMENTS

WO 92/17929  10/1992  WIPO.
WO 93/23909  11/1993  WIPO.

*Primary Examiner*—Adolf Berhane
*Attorney, Agent, or Firm*—Oblon, Spivak, McClelland, Maier & Neustadt, P.C.

[57] ABSTRACT

A linear-motion contactless power supply device for supplying electrical power from a stationary unit to a movable unit without direct contact; the stationary unit being a cylindrical primary conductor to which a high-frequency alternating current is supplied; the movable unit being provided with a secondary conductor which is isolated from the primary conductor and which is arranged coaxially with the primary conductor so as to be slidable in the longitudinal direction of and with respect to the primary conductor and also provided with a high-frequency toroidal core which is arranged so as to cover the secondary conductor from the outside.

5 Claims, 5 Drawing Sheets

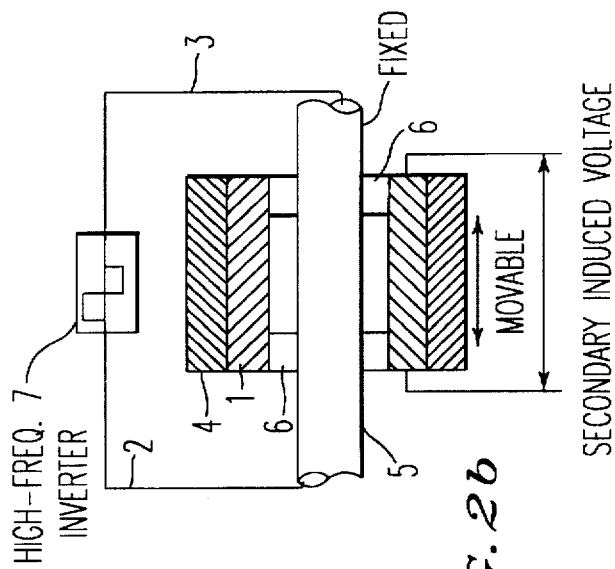
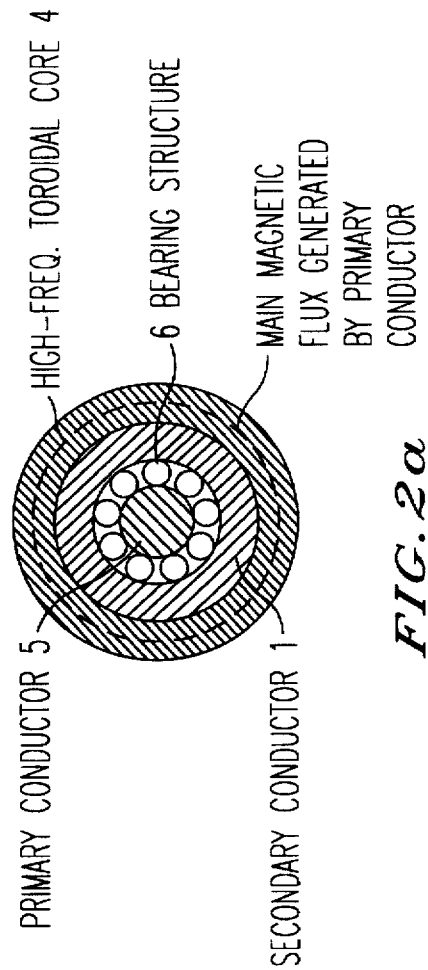
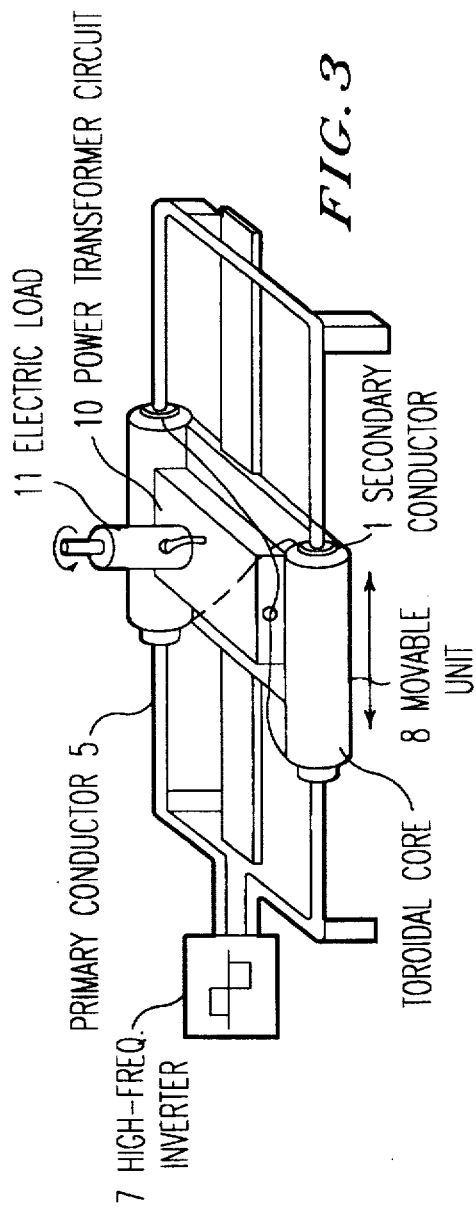

LINEAR-MOTION CONTACTLESS POWER SUPPLY SYSTEM

FIELD OF THE INVENTION

The present invention relates to a linear-motion contactless power supply system for transferring electrical power (including information based on electrical signals) in a linear direction without direct contact through the use of high-frequency electromagnetic induction.

TECHNICAL BACKGROUND

The device shown in FIG. 1 has been known as an example of linear-motion contactless power supply systems of the prior art. In this device, primary conductor (primary coil) 21 is strung as an aerial line, an iron core 23 to which secondary conductor (secondary coil) 22 is attached surrounds primary conductor 21 and is slidably disposed with respect to primary conductor 21. In this case, primary conductor 21 is supported at both end portions 24 in its longitudinal direction in order that iron core 23 is permitted to slide (cf. Japanese Patent Publication No. 23723/1983).

However, if the device has a construction which is elongated in the direction of movement, the primary conductor produces a catenary line due to its own weight, and this leads to the possibility that the primary conductor will make contact with the movable core made of magnetic material on which the secondary conductor is wound in the vicinity of the center of the overall length of the primary conductor as a result of a long-term use or stress caused by mechanical vibration. As a result, support of the primary coil over the overall length of linear range by a non-magnetic rigid body has been considered, but such a structure tends to cause leakage of magnetic flux, and moreover, does not allow for a device of compact structure, and therefore has not proved to be practical. On the other hand, Japanese Patent Laid-open Hei 5-207603 discloses a device in which contactless power supply for a moving body moving on a road surface is constructed through the use of a litz wire bundle. However, such a device cannot be applied for apparatuses which are not intended to be installed on a road.

DISCLOSURE OF THE INVENTION

The object of the present invention is to provide linear-motion contactless power supply device allowing a more compact construction and in which leakage of magnetic flux is prevented.

Another object of the present invention is to provide a linear-motion contactless power supply device wherein the primary conductor (coil) is supported along its overall length by a non-magnetic body, and in which losses of power supply can be prevented without reducing the degree of electromagnetic coupling between the primary and secondary conductors (coils).

A first linear-motion contactless power supply device according to the present invention is provided with a stationary unit and movable unit that can move along the longitudinal direction of this stationary unit, and supplies power from the stationary unit to the movable unit without direct contact, said power supply device being characterized in that the stationary unit is a cylindrical primary conductor to which is supplied a high-frequency alternating current, and that the movable unit is provided with a secondary conductor and a high-frequency toroidal core, wherein the secondary conductor is isolated from the primary conductor and is arranged coaxially with the primary conductor so as to be slidable in the longitudinal direction of the primary conductor, and the high-frequency toroidal core is arranged so as to cover the secondary conductor from the outside.

A second linear-motion contactless power supply device according to the present invention is provided with a stationary unit and a movable unit that can move along the longitudinal direction of the stationary unit, and allows supply of electrical power from the stationary unit to the movable unit without direct contact, wherein the stationary unit includes a primary-side core, which is a rod-shaped high-frequency magnetic substance, and a primary-side coil made of litz wire bundles each of which is a multiplicity of insulated wires bundled and connected at both ends and to which a high-frequency alternating current is supplied, the primary core and the primary coil being fixed integrally by a non-magnetic material; and the movable unit is made up of a high-frequency magnetic substance core arranged so as to straddle the litz wire bundle of the stationary unit and also of a secondary coil that is wound around this core.

As described above, the present invention offers an effect that a device can be realized in which leakage in magnetic flux interlinkage is unlikely to occur. In addition, the present invention provides a solution to the problem of mechanical support of the primary coil (or conductor) (i.e., sagging over the length of a structure due to the structure's own weight) in a linear-motion contactless power supply device, and furthermore, realizes a highly rigid structure that can stand up to long-term use and stress due to mechanical vibration.

BRIEF DESCRIPTION OF THE DRAWINGS

FIG. 2 shows an embodiment of the present invention, FIG. 2(a) being a sectional view and FIG. 2(b) being a plan view.

FIG. 3 shows another embodiment of the present invention.

BEST MODE FOR WORKING THE INVENTION

Figure 1:
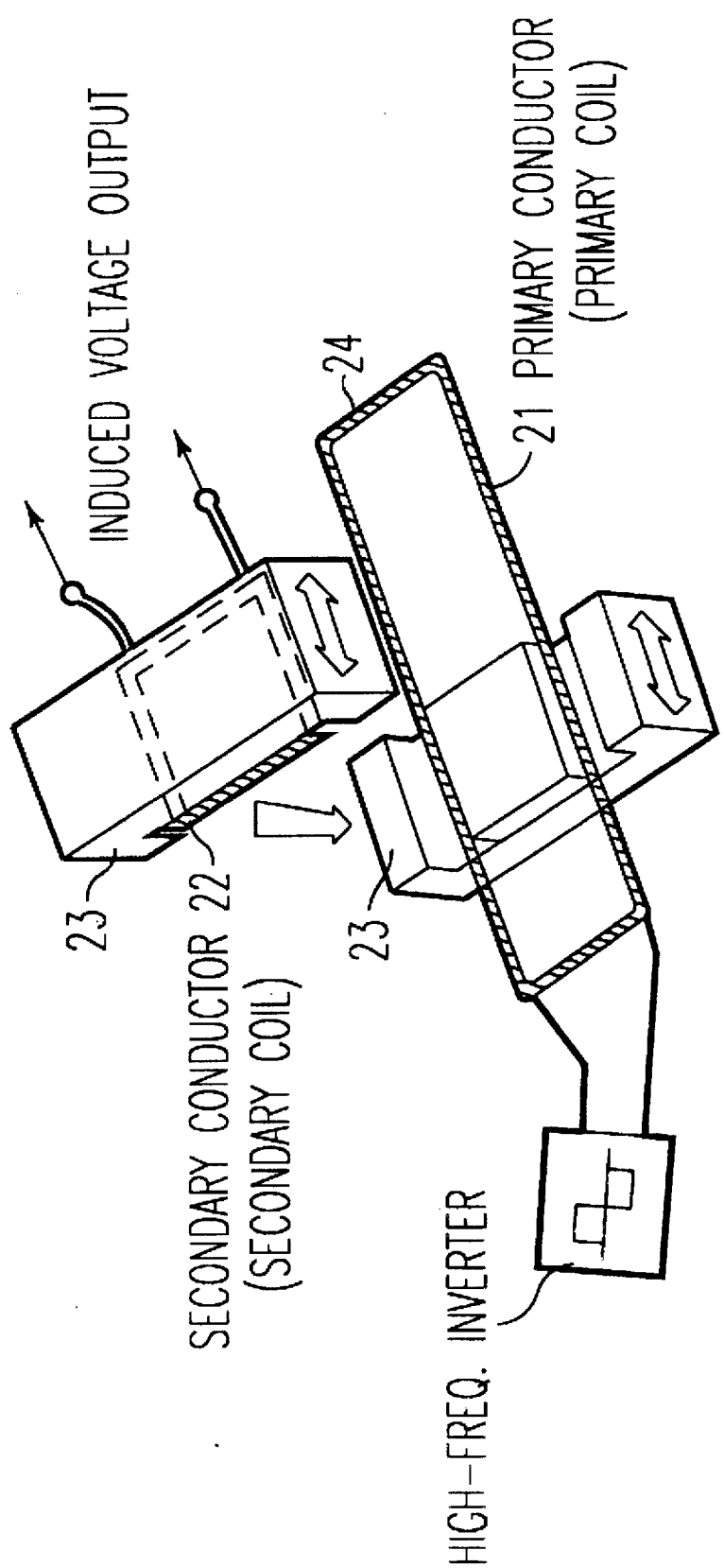
FIG. 1 shows an example of the prior art.

FIG. 2 shows a first embodiment of the linear-motion contactless power supply device of the present invention.

In the present embodiment, secondary conductor 1 has a hollow-pipe structure having both ends connected to lead wires 2 and 3 through which induced voltage is taken out.

Toroidal core 4, which is made of a high-frequency magnetic material, is affixed to secondary conductor 1 so as to completely cover this secondary conductor.

Primary conductor 5 is arranged coaxial with the direction of linear movement within the hollow space of secondary conductor 1, primary conductor 5 and secondary conductor 1 being electrically isolated; and as necessary, a slidable support structure is provided between primary conductor 5 and secondary conductor 1. As an example, employment of ceramic bearing structure 6 enables both electrical isolation and prevention of sagging in the direction of gravitational force due to the weight of primary conductor 5.

Primary conductor 5 is stationary, both ends of primary conductor 5 are connected to high-frequency inverter 7, and a main magnetic flux is generated inside toroidal core 4 by high-frequency excitation.

In this device, a single conductor of large current capacity is used as primary conductor 5, which can be operated at the limit of the current supply capacity of a high-frequency inverter. In this case, voltage is induced in secondary conductor 1 at a one-to-one turn ratio due to the construction of secondary conductor 1.

In the secondary conductor connected to the electric load, voltage is induced at both ends of the secondary conductor such that current flows to prevent changes in magnetic flux generated within toroidal core 4 due to high-frequency excitation caused by current flowing through primary conductor 5.

FIG. 3 shows a contactless power supply system in which the contactless power supply device of the present invention shown in FIG. 2 is applied.

In this system, the structure shown in FIG. 2 is serially connected in order to effectively use the main magnetic flux produced by the primary conductor. As a result, two sets of toroidal cores and secondary conductors are employed.

Namely, movable unit 8 is constructed so as to slide on rail 9, and secondary conductors and toroidal cores as shown in FIG. 2 are provided on both wing portions as viewed in the direction of motion. Primary conductor 5 is arranged in a loop pattern and passes through the hollow portion of the secondary conductors 1 on both wings.

Both ends of secondary conductor 1 are connected to power transformer circuit 10 on movable unit 8 and, by means of a semiconductor switch provided within power transformer circuit 10, the output of secondary conductor 1 is converted to a low-frequency current or, following rectification, converted to direct current. The output of power transformer circuit 10 becomes the operating power source for electric load 11 such as an electric motor installed on movable unit 8.

Figure 4A:
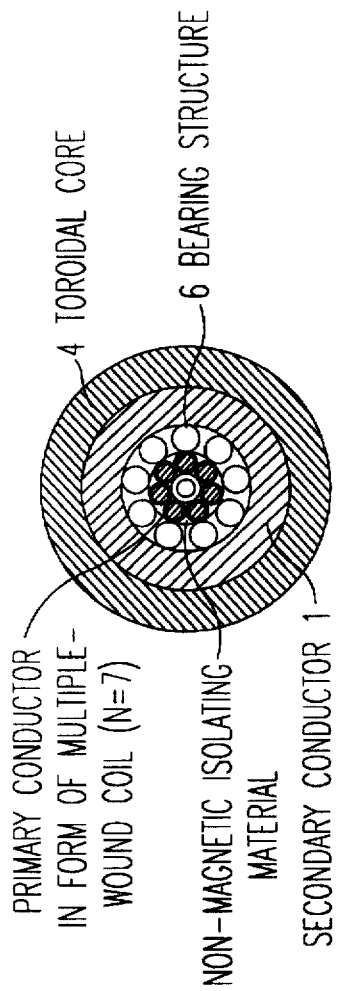
FIG. 4 shows another embodiment of the present invention, FIG. 4(a) being a sectional view, and FIG. 4(b) being a plan view.
Figure 4B:
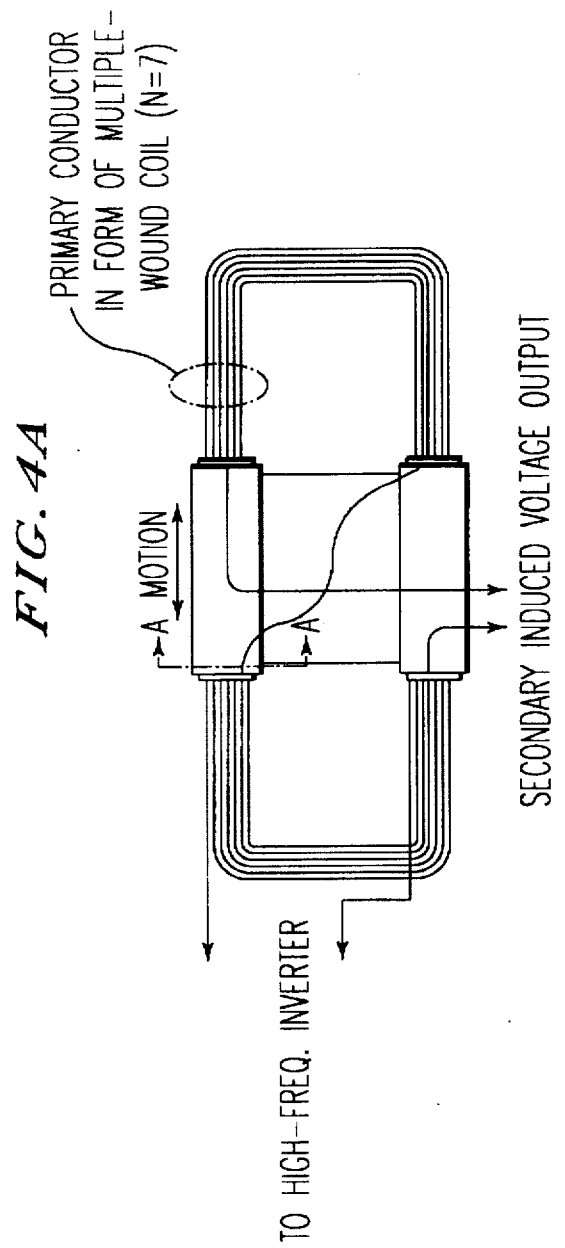
Figure 5:
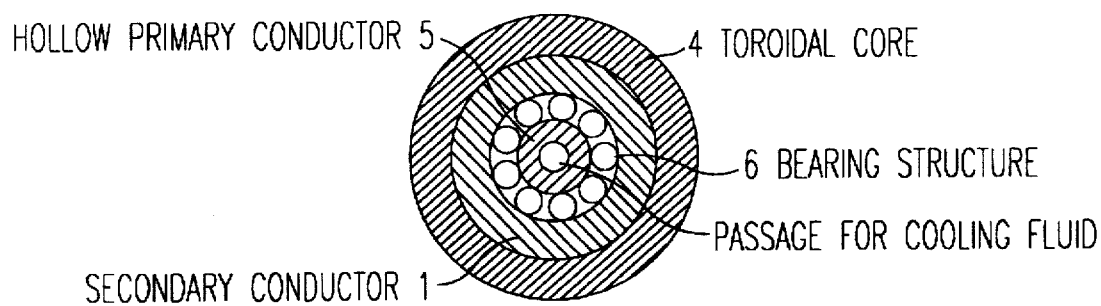
FIG. 5 shows yet another embodiment of the present invention.

When the output current capacity of the high-frequency inverter is small, the primary conductor may be in the form of a multiple-wound coil as shown in FIG. 4. In this case, output voltage is generated on the secondary side at a ratio of N-to-1. In addition, as shown in FIG. 5, a conductor having a hollow interior may be employed for the primary conductor and a fluid for cooling may be circulated through this space to prevent heat generation.

Figure 6:
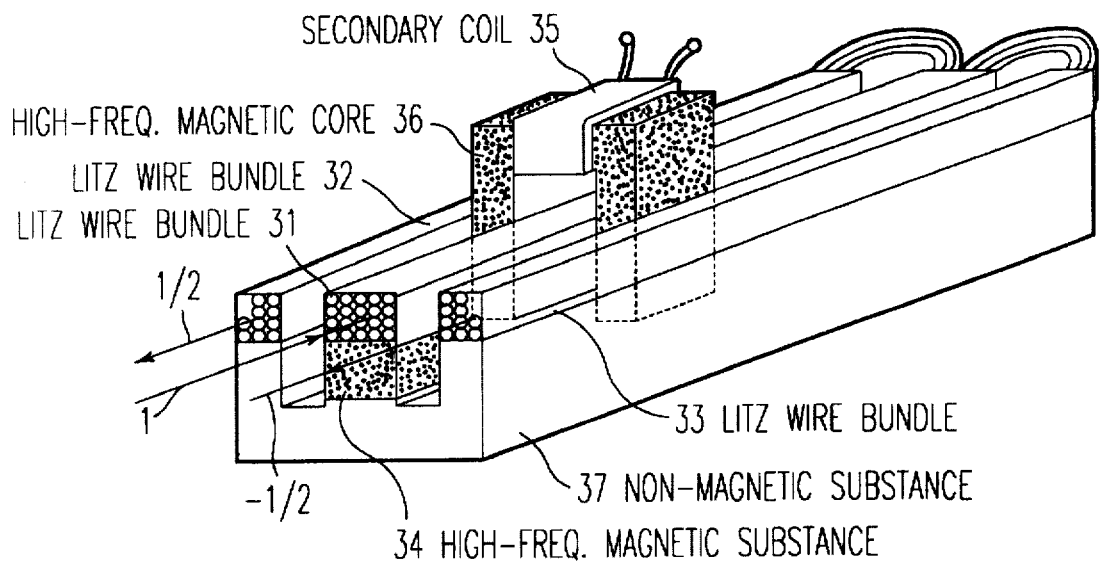
FIG. 6 shows still another embodiment of the present invention.

FIG. 6 shows another embodiment of a linear-motion contactless power supply device according to the present invention.

In this device, the primary coil is composed of a central litz wire bundle 31 and litz wire bundles divided into two portions 32 and 33 to the left and right of litz wire bundle 31. A litz wire bundle refers to a multitude of insulated wires, rather than being a single conductor, bundled and connected at both ends in order to prevent power loss that occurs due to skin effect during the passage of high-frequency current.

The primary coil is formed by winding a single or multiple turns of this type of litz-wire wiring. The number of bundled wires for each of litz wire bundles 32 and 33 is set to one half the number of bundled wires of litz wire bundle 31, and electric current is caused to flow through each of these bundles that is half the current passing through litz wire bundle 31, thereby generating magnetic flux. In the lower portion of litz wire bundle 31, a rod-shaped high-frequency magnetic substance 34 is connected in close contact over the entire length of linear motion, and this high-frequency magnetic substance 34 mechanically supports litz wire bundle 31. In addition, high-frequency magnetic substance core 36 forms a magnetic path for the main magnetic flux generated by the primary coil in a form that straddles high-frequency magnetic substance 34 over an extremely narrow interposed gap in order that the magnetic flux produced by the primary coil interlinks with secondary coil 35 to be described hereinbelow.

High-frequency magnetic substance 34 and high-frequency magnetic substance core 36 are made of the same high-frequency magnetic material, and if their magnetic permeability is set to an extremely high level as compared with that of air (for example, 2000 times or greater), most of the magnetic flux generated by litz wire bundles 31, 32 and 33 making up the primary coil will interlink with secondary coil 35. Such a construction enables contactless power transfer from the primary to the secondary side with negligible loss.

In addition, a non-magnetic support material 37 is connected in close contact along the entire length of linear sliding in the lower portions of litz wire bundles 32 and 33, and this support material mechanically supports these wire bundles.

Figure 7:
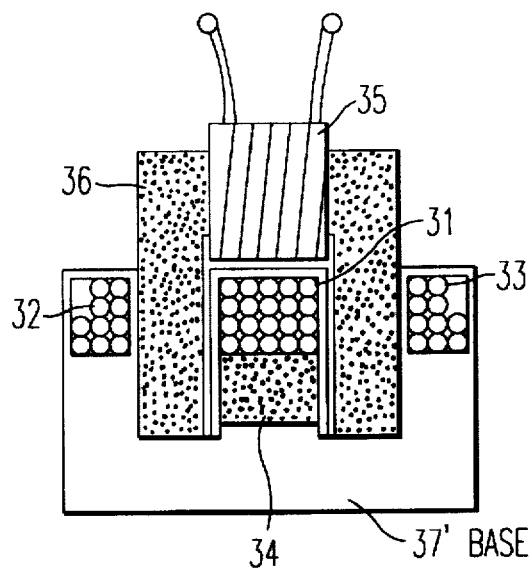
FIG. 7 shows yet another embodiment of the present invention.

The primary coil is thus mechanically supported over its entire length. FIG. 7 shows a further development of the device of FIG. 6 in which litz wire bundles 31, 32 and 33 as well as high-frequency magnetic substance 34, which are non-moving components, are constituted as a single unit. In the embodiment of FIG. 7, mechanical strength can be ensured with no disruption of electromagnetic induction characteristics by inlaying the entire structure within base 37' of a non-magnetic material such as a ceramic. In this construction, however, the gap between high-frequency magnetic substance 34 and high-frequency magnetic substance core 36 attached to the movable unit exerts a large and direct effect on power transfer efficiency. The stationary unit must therefore be machined so that this gap can be suppressed to an extremely small dimension, so that the size of this gap will not vary according to position, and so that aging will not occur. Obviously, the mechanical precision of high-frequency magnetic core 36 and the rigidity of the positioning structure of the movable unit must attain high levels.

INDUSTRIAL APPLICABILITY

The present invention is a device for transferring electric power from a stationary unit to a movable unit without direct contact and can be applied to industrial machinery such as machine tools.

What is claimed is:

1. A linear-motion contactless power supply device including a stationary unit and a movable unit movable along the longitudinal direction of said stationary unit for supplying electrical power from said stationary unit to said movable unit without direct contact;

said stationary unit being a cylindrical primary conductor to which a high-frequency alternating current is supplied;

said movable unit being provided with a secondary conductor which is isolated from said primary conductor and which is arranged coaxially with said primary conductor, said movable unit also having a high-frequency toroidal core which is arranged so as to cover said secondary conductor from the outside, and slidable support means of a ceramic bearing structure interposed between said primary and secondary conductors for sliding said secondary conductor in the longitudinal direction of and with respect to said primary conductor, electrically insulating between said primary and second conductors and also preventing sagging in the gravitational direction.

2. A linear-motion contactless power supply device according to claim 1 wherein said secondary conductor having said toroidal core on the outside is provided on both wing portions of a movable unit, and a primary conductor is arranged in a oblong loop form that passes through hollow portions of these secondary conductors.

3. A linear-motion contactless power supply device including a stationary unit and a movable unit movable along the longitudinal direction of said stationary unit for supplying electrical power from said stationary unit to said movable unit without direct contact;

said stationary unit comprising a rod of a high-frequency magnetic substance and a primary coil made up of a central portion, left and right portions divided from said central portion, said left and right portions being structured so that through each of the left and right portions an electric current that is one half the current through said central portion flows, said rod of the high-frequency magnetic substance mechanically supporting said central portion of the primary coil over the entire length of linear motion; and said movable unit comprising a core of a high-frequency magnetic substance constructed so as to form a magnetic path along with said rod of a high-frequency magnetic substance for main magnetic flux generated by said primary coil, and a secondary coil wound around this core.

4. A linear-motion contactless power supply device according to claim 3, wherein said primary coil is made up of litz wire bundles which is a multitude of insulated wires bundled and connected at both ends and the number of bundled wires for each of said left and right portions is set to one half the number of bundled wires of said central portion, wherein said rod of a high-frequency magnetic substance and said left and right portions of said primary coil are connected through a non-magnetic material, and wherein said core comprised in said movable unit is arranged so as to straddle said litz wire bundle of said central portion.

5. A linear-motion contactless power supply device according to claim 4 wherein said non-magnetic material is a ceramic.

* * * * *